US009130603B2

(12) United States Patent
Gopalan et al.

(10) Patent No.: US 9,130,603 B2
(45) Date of Patent: Sep. 8, 2015

(54) SYSTEMS AND METHODS FOR COLLISION AVOIDANCE IN NEAR-FIELD COMMUNICATIONS

(71) Applicant: QUALCOMM Incorporated, San Diego, CA (US)

(72) Inventors: RaviKiran Gopalan, San Diego, CA (US); James Y. Hurt, San Diego, CA (US); Faramarz Sabouri, San Diego, CA (US); Thinh Nguyen, Santa Clara, CA (US)

(73) Assignee: QUALCOMM Incorporated, San Diego, CA (US)

(*) Notice: Subject to any disclaimer, the term of this patent is extended or adjusted under 35 U.S.C. 154(b) by 118 days.

(21) Appl. No.: 14/020,702

(22) Filed: Sep. 6, 2013

(65) Prior Publication Data

US 2014/0080414 A1 Mar. 20, 2014

Related U.S. Application Data

(60) Provisional application No. 61/702,470, filed on Sep. 18, 2012.

(51) Int. Cl.
*H04B 5/00* (2006.01)
(52) U.S. Cl.
CPC ............ *H04B 5/0043* (2013.01); *H04B 5/0075* (2013.01); *H04B 5/0031* (2013.01); *H04B 5/0037* (2013.01); *H04B 5/0093* (2013.01)

(58) Field of Classification Search
CPC ... H04B 5/0025; H04B 5/0043; H04B 5/0087
USPC .................. 455/41.1, 41.2, 43, 130, 131, 133, 455/190.1, 207, 274, 323
See application file for complete search history.

(56) References Cited

U.S. PATENT DOCUMENTS

| 4,821,294 | A | 4/1989 | Thomas, Jr. |
| 5,050,234 | A * | 9/1991 | Ohteru ........................ 455/509 |
| 7,209,706 | B2 | 4/2007 | Fujii et al. |
| 2010/0291871 | A1 | 11/2010 | Butler |
| 2010/0328047 | A1 | 12/2010 | Jantunen et al. |
| 2012/0045989 | A1 | 2/2012 | Suumaeki et al. |
| 2012/0248891 | A1 | 10/2012 | Drennen |
| 2012/0322399 | A1 * | 12/2012 | Sheikholeslami ............ 455/334 |

* cited by examiner

*Primary Examiner* — Tuan Pham
(74) *Attorney, Agent, or Firm* — Knobbe Martens Olson & Bear, LLP

(57) ABSTRACT

Systems, methods, and devices for wireless communication are included herein. An aspect of the subject matter described in the disclosure provides a device configured to detect a transmission. The device includes a receiver configured to receive an inductive communication signal having a center frequency. The device further includes an analog-to-digital converter configured to sample the signal at a rate higher than twice the center frequency. The device further includes one or more processors configured to digitally downconvert the signal. The processors are further configured to compare an energy of the downconverted signal to a detection threshold. The device further includes a transmitter configured to selectively transmit a communication based on the comparison.

36 Claims, 6 Drawing Sheets

SYSTEMS AND METHODS FOR COLLISION AVOIDANCE IN NEAR-FIELD COMMUNICATIONS

CROSS-REFERENCE TO RELATED APPLICATIONS

This application claims the benefit of U.S. Provisional Application No. 61/702,470, filed Sep. 18, 2012, the entirety of which is incorporated herein by reference.

BACKGROUND

1. Field

The present invention relates generally to wireless communication. More specifically, the present invention relates to methods and devices for collision avoidance in a near-field communication mode.

2. Background

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) technology. NFC technology is commonly used for contactless short-range communications based on radio frequency identification (RFID) standards, using magnetic field induction to enable communication between electronic devices, including mobile wireless communications devices. These short-range communications include applications for payment and ticketing, electronic keys, identification, device set-up service and similar information sharing. This short-range high frequency wireless communications technology exchanges data between devices over a short distance, such as only a few centimeters.

As will be appreciated by a person having ordinary skill in the art, electronic devices can be configured to transmit and/or receive data via near-field communication (NFC). For example, a device can be configured to communicate with an electronic reader, such as an "Oyster Card" reader. Via NFC, an electronic device can make a payment, gain access through a barrier, or a combination thereof. When multiple NFC devices transmit simultaneously, collisions may occur. Accordingly, systems and methods for efficiently detecting and avoiding collisions are desired.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a method of detecting an inductive communication transmission. The method includes receiving an inductive communication signal having a center frequency. The method further includes sampling the signal at a rate higher than twice the center frequency. The method further includes digitally downconverting the sampled signal. The method further includes comparing an energy of the downconverted signal to a detection threshold. The method further includes selectively transmitting a communication based on the comparison.

Another aspect of the subject matter described in the disclosure provides method of collision avoidance in a near-field communications (NFC) device. The method includes receiving a NFC signal having a carrier frequency. The method further includes sampling the signal at four times the carrier frequency. The method further includes digitally downconverting the sampled signal. The method further includes comparing an energy of the downconverted signal to a detection threshold. The method further includes selectively transmitting a communication based on the comparison.

Another aspect of the subject matter described in the disclosure provides a device configured to detect an inductive communication transmission. The device includes a receiver configured to receive an inductive communication signal having a center frequency. The device further includes an analog-to-digital converter configured to sample the signal at a rate higher than twice the center frequency. The device further includes one or more processors configured to digitally downconvert the sampled signal. The processors are further configured to compare an energy of the downconverted signal to a detection threshold. The device further includes a transmitter configured to selectively transmit a communication based on the comparison.

Another aspect of the subject matter described in the disclosure provides a near-field communication device configured to avoid collision. The device includes a receiver configured to receive a NFC signal having a carrier frequency. The device further includes an analog-to-digital converter configured to sample the signal at four times the carrier frequency. The device further includes one or more processors configured to digitally downconvert the sampled signal. The processors are further configured to compare an energy of the downconverted signal to a detection threshold. The device further includes a transmitter configured to selectively transmit a communication based on the comparison.

Another aspect of the subject matter described in the disclosure provides an apparatus for detecting an inductive communication transmission. The apparatus includes means for receiving an inductive communication signal having a center frequency. The apparatus further includes means for sampling the signal at a rate higher than twice the center frequency. The apparatus further includes means for digitally downconverting the sampled signal. The apparatus further includes means for comparing an energy of the downconverted signal to a detection threshold. The apparatus further includes means for selectively transmitting a communication based on the comparison.

Another aspect of the subject matter described in the disclosure provides an apparatus for collision avoidance in a near-field communications (NFC) device. The apparatus includes means for receiving a NFC signal having a carrier frequency. The apparatus further includes means for sampling the signal at four times the carrier frequency. The apparatus further includes means for digitally downconverting the sampled signal. The apparatus further includes means for comparing an energy of the downconverted signal to a detection threshold. The apparatus further includes means for selectively transmitting a communication based on the comparison.

Another aspect of the subject matter described in the disclosure provides a non-transitory computer-readable medium including code that, when executed, causes an apparatus to receive an inductive communication signal having a center frequency. The medium further includes code that, when executed, causes the apparatus to sample the signal at a rate higher than twice the center frequency. The medium further includes code that, when executed, causes the apparatus to digitally downconvert the sampled signal. The medium further includes code that, when executed, causes the apparatus to compare an energy of the downconverted signal to a detection threshold. The medium further includes code that, when executed, causes the apparatus to selectively transmit a communication based on the comparison.

Another aspect of the subject matter described in the disclosure provides a non-transitory computer-readable medium including code that, when executed, causes a near-field communication apparatus to receive a NFC signal having a carrier frequency. The medium further includes code that, when executed, causes the apparatus to sample the signal at four times the carrier frequency. The medium further includes code that, when executed, causes the apparatus to digitally downconvert the sampled signal. The medium further includes code that, when executed, causes the apparatus to compare an energy of the downconverted signal to a detection threshold. The medium further includes code that, when executed, causes the apparatus to selectively transmit a communication based on the comparison.

DETAILED DESCRIPTION

The detailed description set forth below in connection with the appended drawings is intended as a description of various embodiments. The detailed description includes specific details for the purpose of providing a thorough understanding of embodiments. It will be apparent to those skilled in the art that the embodiments can be practiced without these specific details. In some instances, well-known structures and devices are shown in block diagram form in order to avoid obscuring the novelty of the embodiments presented herein.

Figure 1:
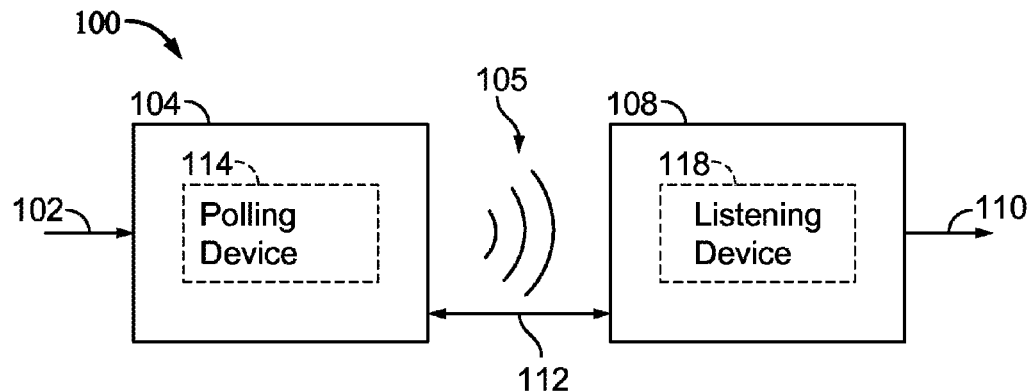
FIG. 1 is a functional block diagram of an example of a wireless communication system, in accordance with exemplary embodiments of the invention.

FIG. 1 is a functional block diagram depicting an example of a wireless communication system 100, in accordance with various embodiments. Input power 102 can be provided to a polling device 104 from a power source (not shown) for generating a field 105 for providing energy transfer and/or wireless communication. A listening device 108 can couple to the field 105 and generate output signal 110. Both the polling device 104 and the listening device 108 are separated by a distance 112. In an embodiment, polling device 104 and listening device 108 are configured according to a mutual resonant relationship. When the resonant frequency of listening device 108 and the resonant frequency of polling device 104 are substantially the same or very close, transmission losses between the polling device 104 and the listening device 108 are minimal. As such, wireless communication can be provided over a relatively large distance. By contrast, purely inductive solutions can require large coils to be in very close (e.g., millimeters) proximity. Resonant inductive coupling techniques can thus facilitate improved efficiency and communication over various distances using a variety of inductive coil configurations.

The listening device 108 can receive power and/or wireless communications when located in an energy field 105 produced by the polling device 104. The field 105 corresponds to a region where energy output by the polling device 104 can be captured by a receiver 108. In some cases, the field 105 can correspond to the "near field" of the polling device 104 as will be further described below. The polling device 104 can include a transmit coil 114 for outputting a transmission. The listening device 108 further includes a receive coil 118 for receiving or capturing the transmission. The near-field can correspond to a region in which there are strong reactive fields resulting from the currents and charges in the transmit coil 114 radiating at low power away from the transmit coil 114. In some cases the near-field can correspond to a region within about one wavelength (or a fraction thereof) of the transmit coil 114. The transmit and receive coils 114 and 118 are sized according to applications and devices to be associated therewith. As described above, efficient energy transfer can occur by coupling a large portion of the energy in a field 105 of the transmit coil 114 with a receive coil 118 rather than propagating most of the energy in an electromagnetic wave to a far field. When positioned within the field 105, a "coupling mode" can be developed between the transmit coil 114 and the receive coil 118.

In various embodiments, the transmit antenna 114 can also act as a receive antenna, and the receive antenna 118 can also act as a transmit antenna. Moreover, both the polling device 104 and the listening device 108 can be configured to both transmit and receive power and/or communications. Accordingly, the polling device 104 can include both transmit and receive circuitry as described herein, and the listening device 108 can include both transmit and receive circuitry as described herein.

Figure 2:
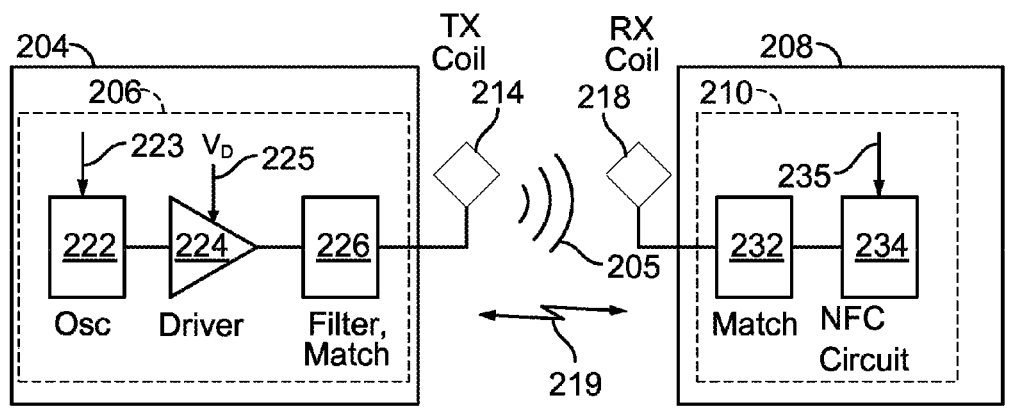
FIG. 2 is a functional block diagram of examples of components that can be used in the wireless communication system of FIG. 1, in accordance with various embodiments of the invention.

FIG. 2 is a functional block diagram of examples of components that can be used in the wireless communication system 100 of FIG. 1, in accordance with various embodiments of the invention. The transmitter 204 can include transmit circuitry 206 that can include an oscillator 222, a driver circuit 224, and a filter and matching circuit 226. The oscillator 222 can be configured to generate a signal at a desired frequency, such as 468.75 KHz, 6.78 MHz or 13.56 MHz, that can be adjusted in response to a frequency control signal 223. The oscillator frequency can variously be referred to as a carrier frequency or center frequency. The frequency can be relatively low-frequency. The oscillator signal can be provided to a driver circuit 224 configured to drive the transmit coil 214 at, for example, a resonant frequency of the transmit coil 214. The driver circuit 224 can be a switching amplifier configured to receive a square wave from the oscillator 222 and output a sine wave. For example, the driver circuit 224 can be a class E amplifier. A filter and matching circuit 226 can be also included to filter out harmonics or other unwanted frequencies and match the impedance of the transmitter 204 to the transmit coil 214.

The listening device 208 can include receive circuitry 210 that can include a matching circuit 232 and a rectifier and a communication circuit 234 to receive power and/or communications. The matching circuit 232 can be included to match the impedance of the receive circuitry 210 to the receive coil 218. The listening device 208 and transmitter 204 can additionally communicate on a separate communication channel 219 (e.g., Bluetooth, zigbee, cellular, etc). The listening device 208 and transmitter 204 can alternatively communicate via in-band signaling using characteristics of the wireless field 205. Particularly, communication circuit 234 can implement, for example, NFC communications.

In some embodiments, the listening device 208 can be configured to directly utilize power received from a wireless communication field without charging of a battery (not shown). For example, a communication a device, such as a near-field communication (NFC) or radio-frequency identification a device (RFID can be configured to receive power from a wireless communication field and communicate by interacting with the wireless communication field and/or utilize the received power to communicate with a transmitter 204 or other devices.

Figure 3:
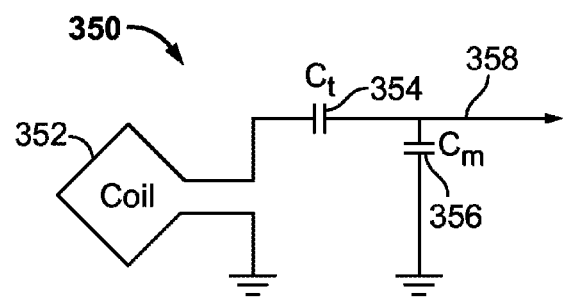
FIG. 3 is a schematic diagram of a portion of transmit circuitry or receive circuitry of FIG. 2, in accordance with embodiments of the invention.

FIG. 3 is a schematic diagram of a portion of transmit circuitry 206 or receive circuitry 210 of FIG. 2 including a transmit or receive coil 352, in accordance with embodiments of the invention. As illustrated in FIG. 3, transmit or receive circuitry 350 used in embodiments can include a coil 352. The coil can also be referred to or be configured as a "loop" antenna 352. The coil 352 can also be referred to herein or be configured as a "magnetic" antenna or an induction coil. The term "coil" is intended to refer to a component that can wirelessly output or receive energy for coupling to another "coil." The coil can also be referred to as an "antenna" of a type that is configured to wirelessly output or receive power. The coil 352 can be configured to include an air core or a physical core such as a ferrite core (not shown). Air core loop coils can be more tolerable to extraneous physical devices placed in the vicinity of the core. Furthermore, an air core loop coil 352 allows the placement of other components within the core area. In addition, an air core loop can more readily enable placement of the receive coil 218 (FIG. 2) within a plane of the transmit coil 214 (FIG. 2) where the coupled mode region of the transmit coil 214 (FIG. 2) can be more powerful.

As stated, efficient transfer of energy between the polling device 104 and listening device 108 can occur during matched or nearly matched resonance between the polling device 104 and the listening device 108. However, even when resonance between the polling device 104 and listening device 108 are not matched, energy can be transferred, although the efficiency can be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance can be simply the inductance created by the coil 352, whereas, capacitance can be added to the coil's inductance to create a resonant structure at a desired resonant frequency. As a non-limiting example, capacitor 354 and capacitor 356 can be added to the transmit or receive circuitry 350 to create a resonant circuit that selects a signal 358 at a resonant frequency. Accordingly, for larger diameter coils, the size of capacitance needed to sustain resonance can decrease as the diameter or inductance of the loop increases. Furthermore, as the diameter of the coil increases, the efficient energy transfer area of the near field can increase. Other resonant circuits formed using other components are also possible. As another non limiting example, a capacitor can be placed in parallel between the two terminals of the coil 352. For transmit coils, a signal 358 with a frequency that substantially corresponds to the resonant frequency of the coil 352 can be an input to the coil 352.

In one embodiment, the polling device 104 can be configured to output a time varying magnetic field with a frequency corresponding to the resonant frequency of the transmit coil 114. When the receiver is within the field 105, the time varying magnetic field can induce a current in the receive coil 118. As described above, if the receive coil 118 is configured to be resonant at the frequency of the transmit coil 114, energy can be efficiently transferred. The AC signal induced in the receive coil 118 can be rectified as described above to produce a DC signal that can be provided to charge or to power a load.

Referring again to FIG. 1, in some embodiments, the polling device 104 and the listening device 108 can implement an NFC protocol such as, for example, ISO/IEC 18092/ECMA-340, ISO/IEC 21481/ECMA-352, and the like. In an embodiment, the polling device 104 and the listening device 108 can be configured to detect the presence of an existing field (for example, from another ongoing NFC link) in the expected transmit spectrum, prior to initiating transmission. Accordingly, the communication circuit 234 (FIG. 2) can include an analog field strength detector connected to a thresholding block to differentiate the field from noise.

In some embodiments, the an analog field strength detector can include an analog filter, and analog mixer, and/or analog averaging circuitry. Analog averaging circuitry can reduce false positives at the thresholding stage in environments with background noise. However, analog solutions can be expensive, for example, having relatively high area and/or power requirements.

In some embodiments, the polling device 104 and/or the listening device 108 can include a direct-conversion receiver to convert the signal to the digital domain. The direct-conversion receiver can be configured to oversample the signal by a factor of four, thereby simplifying quadrature-sampled down conversion. Once in base-band, the signal can be filtered and compared to a suitable threshold.

Figure 4:
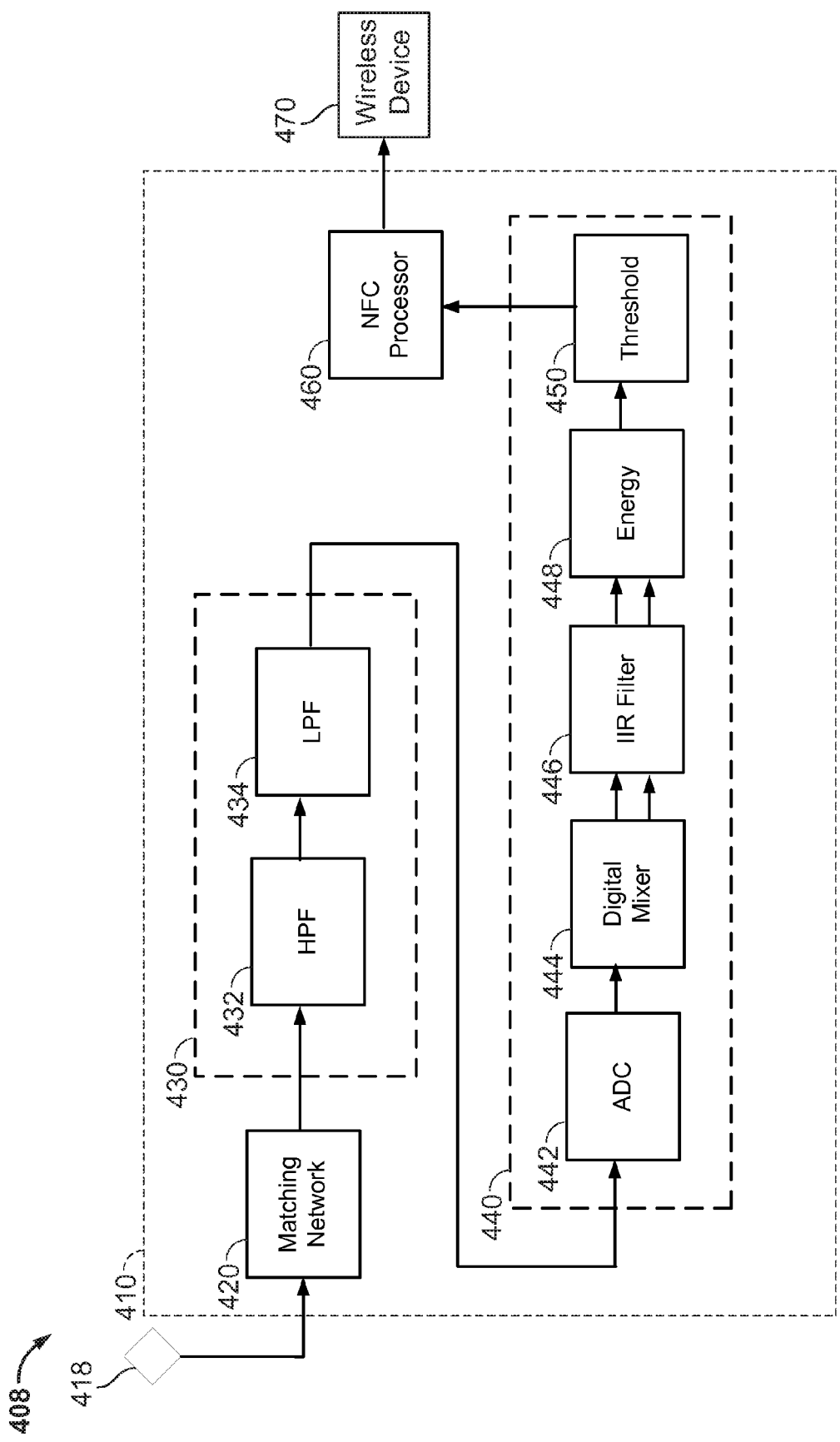
FIG. 4 is a functional block diagram of a receiver that can be used in the wireless communication system of FIG. 1, in accordance with embodiments of the invention.

FIG. 4 is a functional block diagram of a receiver 408 that can be used in the wireless communication system 100 of FIG. 1, in accordance with embodiments of the invention. The receiver 408 includes receive circuitry 410 that can include a receive coil 418. The receiver 408 further couples to a device 470, which can receive communications and/or energy. It should be noted that although the receiver 408 is illustrated as being external to the device 470, the receiver 408 can be partially or fully integrated into the device 470, and/or the wireless device 470 can be partially or fully integrated into the receiver 408. Energy and/or communications can be propagated wirelessly to the receive coil 418 and then transmitted through the rest of the receive circuitry 410 to device

470. By way of example, the wireless device 470 can include devices such as mobile phones, portable music players, laptop computers, tablet computers, computer peripheral devices, communication a devices (e.g., Bluetooth devices), digital cameras, hearing aids (an other medical devices), and the like, which can include polling devices and listening devices with NFC functionality.

The receive coil 418 can be tuned to resonate at the same frequency, or within a specified range of frequencies, as transmit coil 214 (FIG. 2). The receive coil 418 can be similarly dimensioned with the transmit coil 214 or can be differently sized based upon the dimensions of the associated device 470. By way of example, device 470 can be a portable electronic device having diametric or length dimension smaller than the diameter or length of the transmit coil 214. In such an example, the receive coil 418 can be implemented as a multi turn coil in order to reduce the capacitance value of a tuning capacitor (not shown) and increase the receive coil's impedance. By way of example, the receive coil 418 can be placed around the substantial circumference of the device 470 in order to maximize the coil diameter and reduce the number of loop turns (i.e., windings) of the receive coil 418 and the inter winding capacitance.

The receive circuitry 410 can include a matching network 420, an analog filter 430, a field detector 440, and a communications processor 460. The matching network 420 can serve to provide an impedance match to the receive coil 418. The matching network 420 can include one or more passive or active reactance elements such as, for example, resistors, capacitors, and/or inductors.

The analog filter 430 can serve to reject frequencies outside a communications band. The analog filter 430 can include a high-pass filter 432 and a low-pass filter 434. In an embodiment, the high-pass filter 432 can include a cutoff frequency between around 10-11 MHz, and more particularly around 10.56 MHz. In an embodiment, the low-pass filter 434 can include a cutoff frequency between around 16-17 MHz, and more particularly around 16.56 MHz.

The field detector 440 can serve to detect the presence of an RF field (for example, an un-modulated carrier at around 13.56 MHz). For example, the field detector 440 can be configured to detect the presence of an RF field during a listening period. The listening period can include, for example an NFC initial delay time and/or subsequent NFC RF waiting times. In an embodiment, if the field detector 440 detects an RF field in the listening period, the wireless device 470 does not initiate communication. If the field detector 440 does not detect a RF field during the listening period, the device 470 can initiate communication. Accordingly, in some embodiments, the field detector 440 can allow the wireless device 470 to avoid collision, for example, with an ongoing NFC link.

In the illustrated embodiment, the field detector 440 includes an analog-to-digital converter (ADC) 442, a digital mixer 444, an infinite impulse response (IIR) filter 446, an energy detector 448, and a threshold comparator 450. In various embodiments, additional components can be added, and one or more components can be removed. The components can be reordered and/or implemented in combination, and individual components can be implemented as one or more separate components. For example, one or more components of the field detector 440 can be implemented in combination by a processor, digital signal processor (DSP), or the like.

The ADC 442 serves to sample the filtered signal from the analog filter 430, and to convert the signal into the digital domain. In the illustrated embodiment, the filtered signal is not downconverted before sampling. In an embodiment, the ADC 442 can be configured to sample the signal at a rate above the Nyquist sampling frequency (i.e., at about two times a center frequency of the signal). For example, in embodiments where the received signal includes an un-modulated carrier at around 13.56 MHz, the ADC 442 can be configured to sample the signal at around 27-28 MHz, and more particularly at around 27.12 MHz.

In an embodiment, the ADC 442 can be configured to sample the signal at about four times a center frequency of the signal. For example, in embodiments where the received signal includes an un-modulated carrier at around 13.56 MHz, the ADC 442 can be configured to sample the signal at around 54-55 MHz, and more particularly at around 54.24 MHz. In various other embodiments, the ADC 442 can be configured to sample the signal at other rates, for example any multiple of the center frequency.

The digital mixer 444 serves to down-convert the received signal in the digital domain. In an embodiment, the digital mixer 444 can include a digital quadrature mixer 444. In an embodiment, the digital mixer 444 can be configured to use coefficients only from the set $\{0, 1, -1\}$. For example, the digital mixer 444 can be configured to use only value from the set $\{0, 1, -1\}$ in embodiments where the ADC 442 is configured to sample the signal at four times the center frequency. Accordingly, the digital mixer 444 can have a simplified design.

The IIR filter 446 serves to filter the output of the digital mixer 444. For example, the IIR filter 446 can implement a low-pass filter. In various embodiments, other types of filters can be used.

The energy detector 448 serves to determine an energy level of the received signal for comparison to a threshold at the threshold comparator 450. The energy detector 448 can be configured to average the energy level of the received signal over time, for example, to reduce false positives due to noisy RF environments.

The threshold comparator 450 can compare the averaged energy level to a preset and/or dynamically adjusted threshold for non-contentious communications. For example, the threshold can be between about 0.15-0.2 A/m, and more particularly, about 0.187 A/m. When the detected energy level meets and/or surpasses the threshold, the threshold comparator 450 can output a signal indicating that the field is detected. Otherwise, the threshold comparator 450 can output a signal indicating that the field is not detected.

The communications processor 460 serves to provide additional communications functionality. For example, the communications processor 460 can be configured to transmit a communication based on the output of the field detector. In an embodiment, the communications processor 460 is configured to implement NFC communications, and can refrain from transmitting an NFC communication when the field detector detects another NFC carrier signal.

Figure 5:
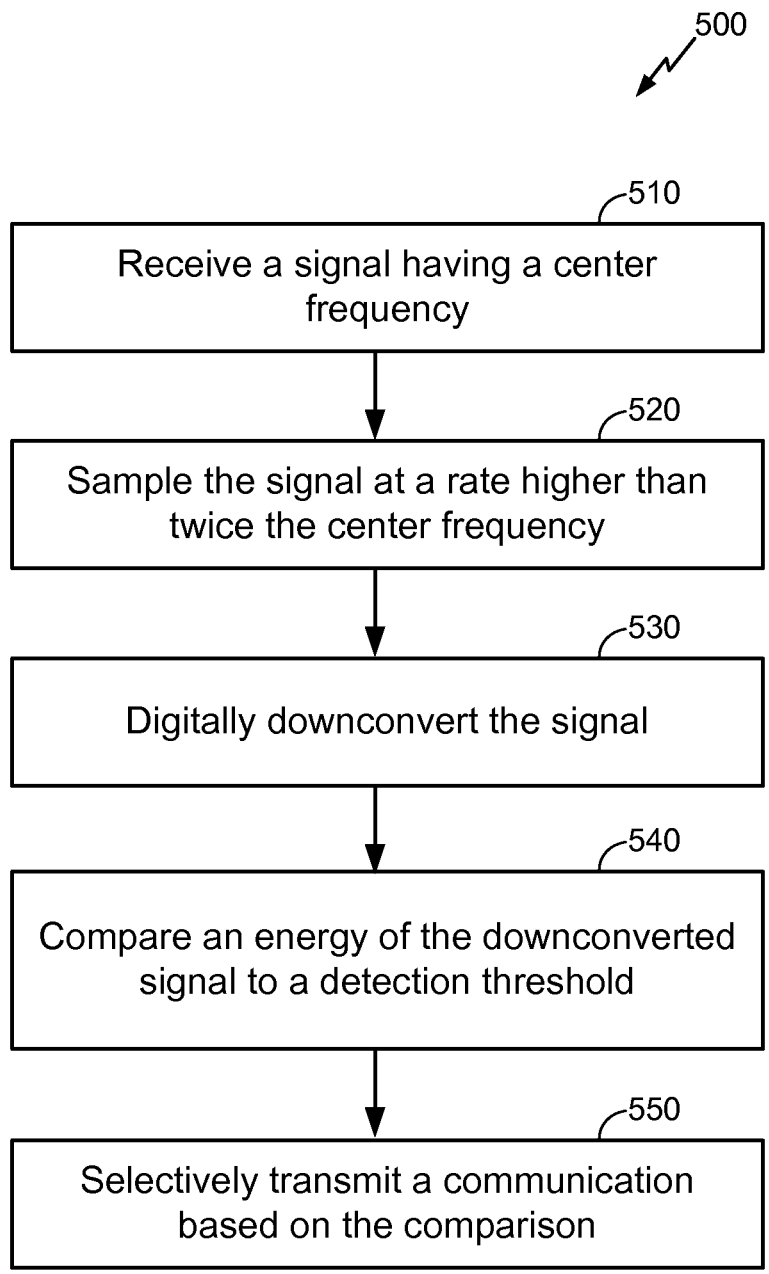
FIG. 5 is a flowchart of an example of a method of detecting a transmission.

FIG. 5 is a flowchart 500 of an example of a method of detecting a transmission. Although the method of flowchart 500 is described herein with reference to the wireless communication system 100 discussed above with respect to FIG. 1, and the receiver 408 discussed above with respect to FIG. 4, a person having ordinary skill in the art will appreciate that the method of flowchart 500 can be implemented by another device described herein, or any other suitable device. In an embodiment, the steps in flowchart 500 can be performed by a processor or controller such as, for example, the processor 460 (FIG. 4), in conjunction with a memory (not shown). Although the method of flowchart 500 is described herein with reference to a particular order, in various embodiments, blocks herein can be performed in a different order, or omitted, and additional blocks can be added.

First, at block 510, a wireless device receives a signal having a center frequency. The signal can be, for example, an NFC carrier signal having a center frequency of around 13.56 MHz. In an embodiment, the listening device 108 can receive the signal or field 105 from the polling device 104, for example via the receive antenna 118. In an embodiment, the receiver 408 receives a signal of the field 105 via the antenna 418 and the matching network 420. The receiver 408 can filter the signal via the analog filter 430.

Next, at block 520, the wireless device samples the signal at a rate higher than twice the center frequency. In an embodiment, the wireless device samples the signal at four times the center frequency. For example, the ADC 442 can sample the received signal at around 54.25 MHz, as discussed above.

Then, at block 530, the wireless device downconverts the signal. For example, the digital mixer 444 can downconvert the signal in the digital domain. In some embodiments, the digital mixer 444 can be implemented as a quadrature mixer configured to use only coefficients in the set of {0, 1, −1}, as discussed above.

In some embodiments, the wireless device determines an energy of the signal. For example, the energy detector 448 can determine an energy, averaged energy, or weighted and averaged energy of the signal.

Thereafter, at block 540, the wireless device compares the energy of the downconverted signal to a detection threshold. For example, the threshold comparator 450 can compare the averaged energy level to a preset and/or dynamically adjusted threshold for non-contentious communications. In an embodiment, the threshold can be stored in a memory. The threshold can be between about 0.15-0.2 A/m, and more particularly, about 0.187 A/m.

Subsequently, at block 550, the wireless device selectively transmits a communication based on the comparison. For example, the communications processor 460 can be configured to transmit a communication based on the output of the field detector. In an embodiment, the communications processor 460 can compare the energy of the downconverted signal to a detection threshold. The communications processor 460 can transmit the communication when the energy of the downconverted signal is below the detection threshold, and can refrain from transmitting the communication when the energy of the downconverted signal is equal to or greater than the detection threshold. In an embodiment, the communications processor 460 is configured to implement NFC communications, and can refrain from transmitting an NFC communication when the field detector detects another NFC carrier signal.

Figure 6:
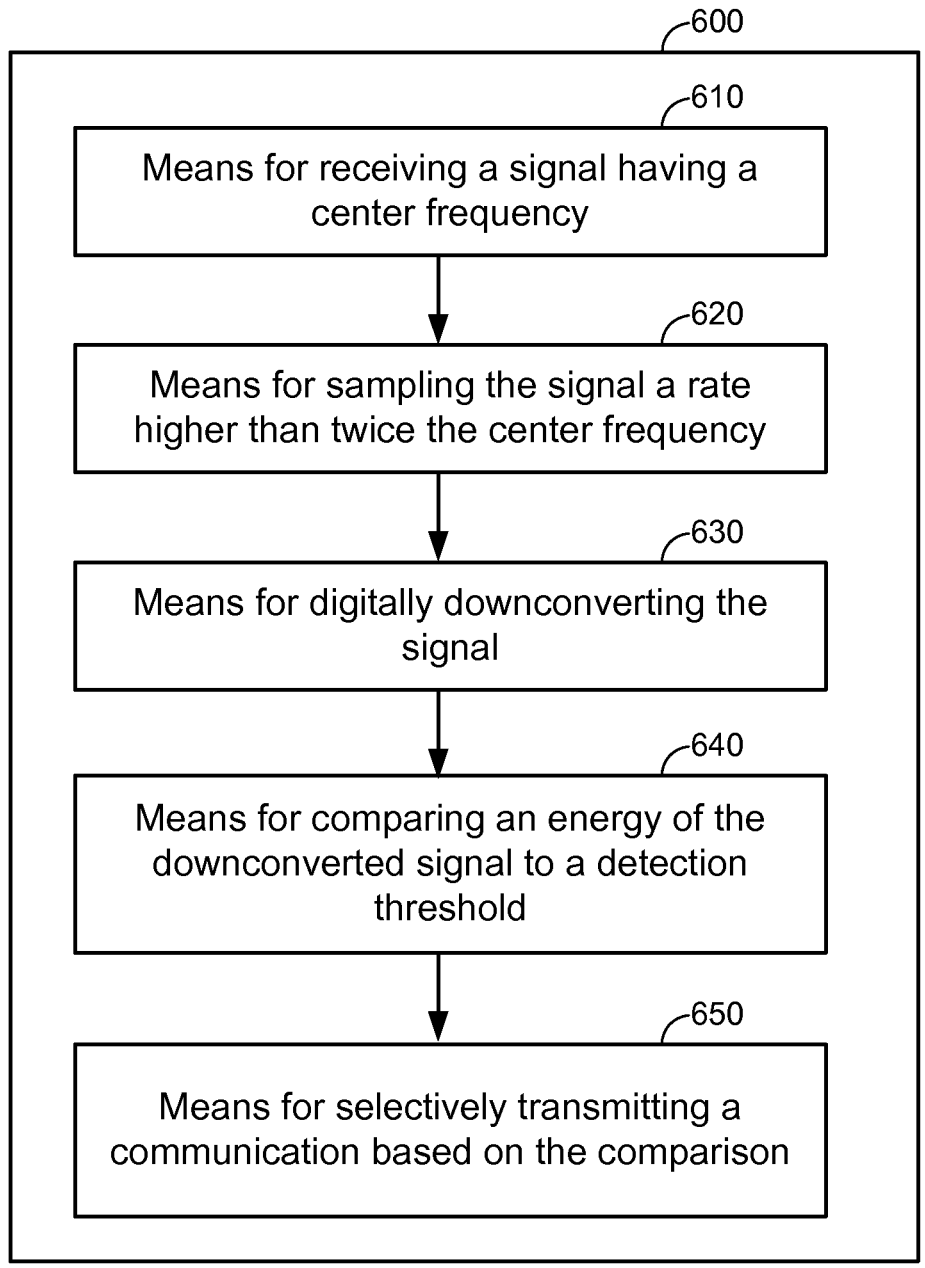
FIG. 6 is a functional block diagram of an apparatus for wireless communication, in accordance with an embodiment of the invention.

FIG. 6 is a functional block diagram of an apparatus for wireless communication 600, in accordance with an embodiment of the invention. Those skilled in the art will appreciate that an apparatus for wireless communication can have more components than the simplified apparatus 600 shown in FIG. 6. The apparatus for wireless communication 600 shown includes only those components useful for describing some prominent features of implementations within the scope of the claims. The apparatus for wireless communication 600 includes means 610 for receiving a signal having a center frequency, means 620 for sampling the signal at a rate higher than twice the center frequency, means 630 for digitally downconverting the signal, means 640 for comparing an energy of the downconverted signal to a detection threshold, and means 650 for selectively transmitting a communication based on the comparison.

In an embodiment, the means 610 for receiving a signal having a center frequency can be configured to perform one or more of the functions described above with respect to block 510 (FIG. 5). In various embodiments, the means 610 receiving a signal having a center frequency can be implemented by one or more of the antennas 118 (FIG. 1), 218 (FIG. 2), 352 (FIG. 3), 418 (FIG. 4), and the receiver 408 (FIG. 4).

In an embodiment, the means 620 for sampling the signal at a rate higher than twice the center frequency can be configured to perform one or more of the functions described above with respect to block 520 (FIG. 5). In various embodiments, the means 620 for sampling the signal at a rate higher than twice the center frequency can be implemented by the ADC 442 (FIG. 4).

In an embodiment, the means 630 for digitally downconverting the signal can be configured to perform one or more of the functions described above with respect to block 530 (FIG. 5). In various embodiments, the means 630 for digitally downconverting the signal can be implemented by one or more of the digital mixer 444 (FIG. 4) and the IIR filter 446 (FIG. 4).

In an embodiment, the means 640 for comparing an energy of the downconverted signal to a detection threshold can be configured to perform one or more of the functions described above with respect to block 540 (FIG. 5). In various embodiments, the means 640 for comparing an energy of the downconverted signal to a detection threshold can be implemented by one or more of the energy detector 448 (FIG. 4) and the threshold comparator 450 (FIG. 4).

In an embodiment, the means 650 for selectively transmitting a communication based on the comparison can be configured to perform one or more of the functions described above with respect to block 550 (FIG. 5). In various embodiments, the means 650 for selectively transmitting a communication based on the comparison can be implemented by one or more of the antennas 114 (FIG. 1), 118 (FIG. 1), 214 (FIG. 2), 218 (FIG. 2), 352 (FIG. 3), and 418 (FIG. 4), the transmitter 206 (FIG. 2), and the processor 460 (FIG. 4).

Figure 7:
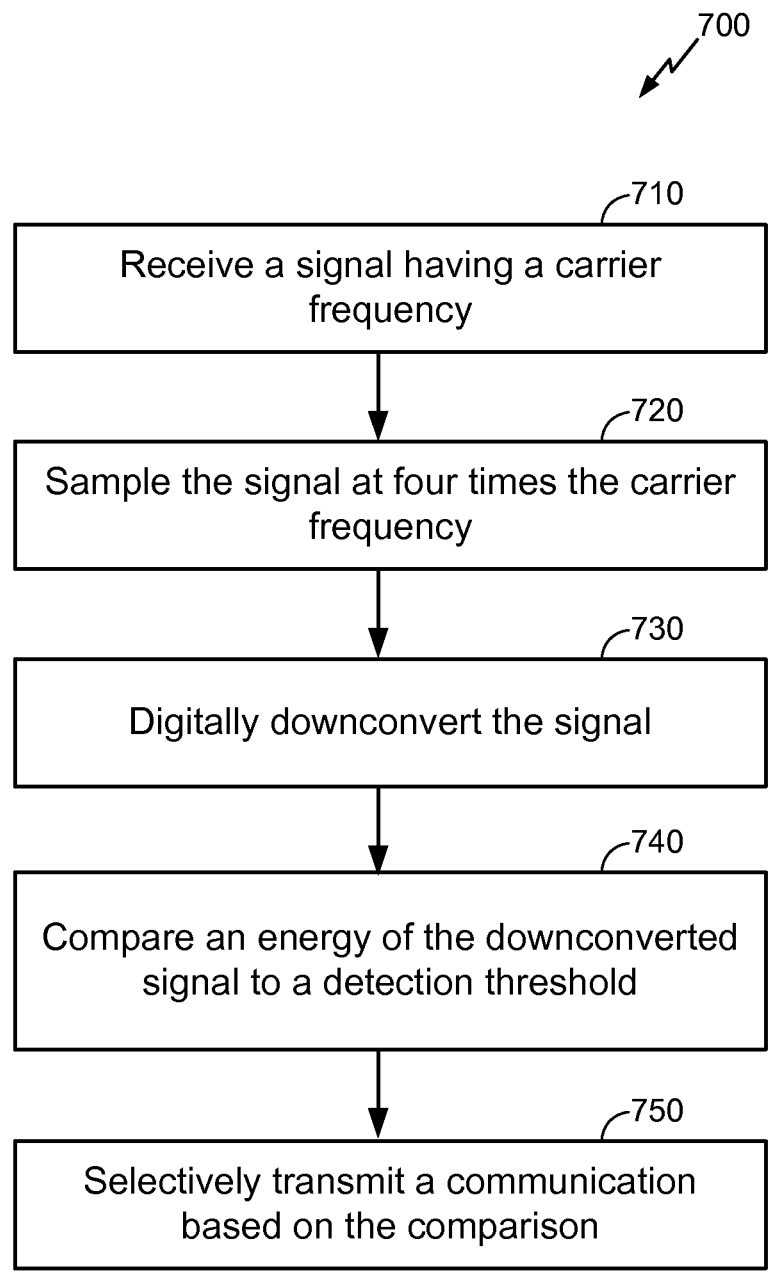
FIG. 7 is a flowchart of an example of a method of avoiding collision in near-field communications.

FIG. 7 is a flowchart 700 of an example of a method of avoiding collision in near-field communications. Although the method of flowchart 700 is described herein with reference to the wireless communication system 100 discussed above with respect to FIG. 1, and the receiver 408 discussed above with respect to FIG. 4, a person having ordinary skill in the art will appreciate that the method of flowchart 700 can be implemented by another device described herein, or any other suitable device. In an embodiment, the steps in flowchart 700 can be performed by a processor or controller such as, for example, the processor 460 (FIG. 4), in conjunction with a memory (not shown). Although the method of flowchart 700 is described herein with reference to a particular order, in various embodiments, blocks herein can be performed in a different order, or omitted, and additional blocks can be added.

First, at block 710, a wireless device receives a signal having a carrier frequency. The signal can be, for example, an NFC carrier signal having a carrier frequency of around 13.56 MHz. In an embodiment, the listening device 108 can receive the signal or field 105 from the polling device 104, for example via the receive antenna 118. In an embodiment, the receiver 408 receives a signal of the field 105 via the antenna 418 and the matching network 420. The receiver 408 can filter the signal via the analog filter 430.

Next, at block 720, the wireless device samples the signal at four times the carrier frequency. For example, the ADC 442 can sample the received signal at around 74.25 MHz, as discussed above.

Then, at block 730, the wireless device downconverts the signal. For example, the digital mixer 444 can downconvert the signal in the digital domain. In some embodiments, the digital mixer 444 can be implemented as a quadrature mixer configured to use only coefficients in the set of {0, 1, −1}, as discussed above.

In some embodiments, the wireless device determines an energy of the signal. For example, the energy detector 448 can determine an energy, averaged energy, or weighted and averaged energy of the signal.

Thereafter, at block 740, the wireless device compares the energy of the downconverted signal to a detection threshold. For example, the threshold comparator 450 can compare the averaged energy level to a preset and/or dynamically adjusted threshold for non-contentious communications. In an embodiment, the threshold can be stored in a memory. The threshold can be between about 0.15-0.2 A/m, and more particularly, about 0.187 A/m.

Subsequently, at block 750, the wireless device selectively transmits a communication based on the comparison. For example, the communications processor 460 can be configured to transmit a communication based on the output of the field detector. In an embodiment, the communications processor 460 is configured to implement NFC communications, and can refrain from transmitting an NFC communication when the field detector detects another NFC carrier signal.

Figure 8:
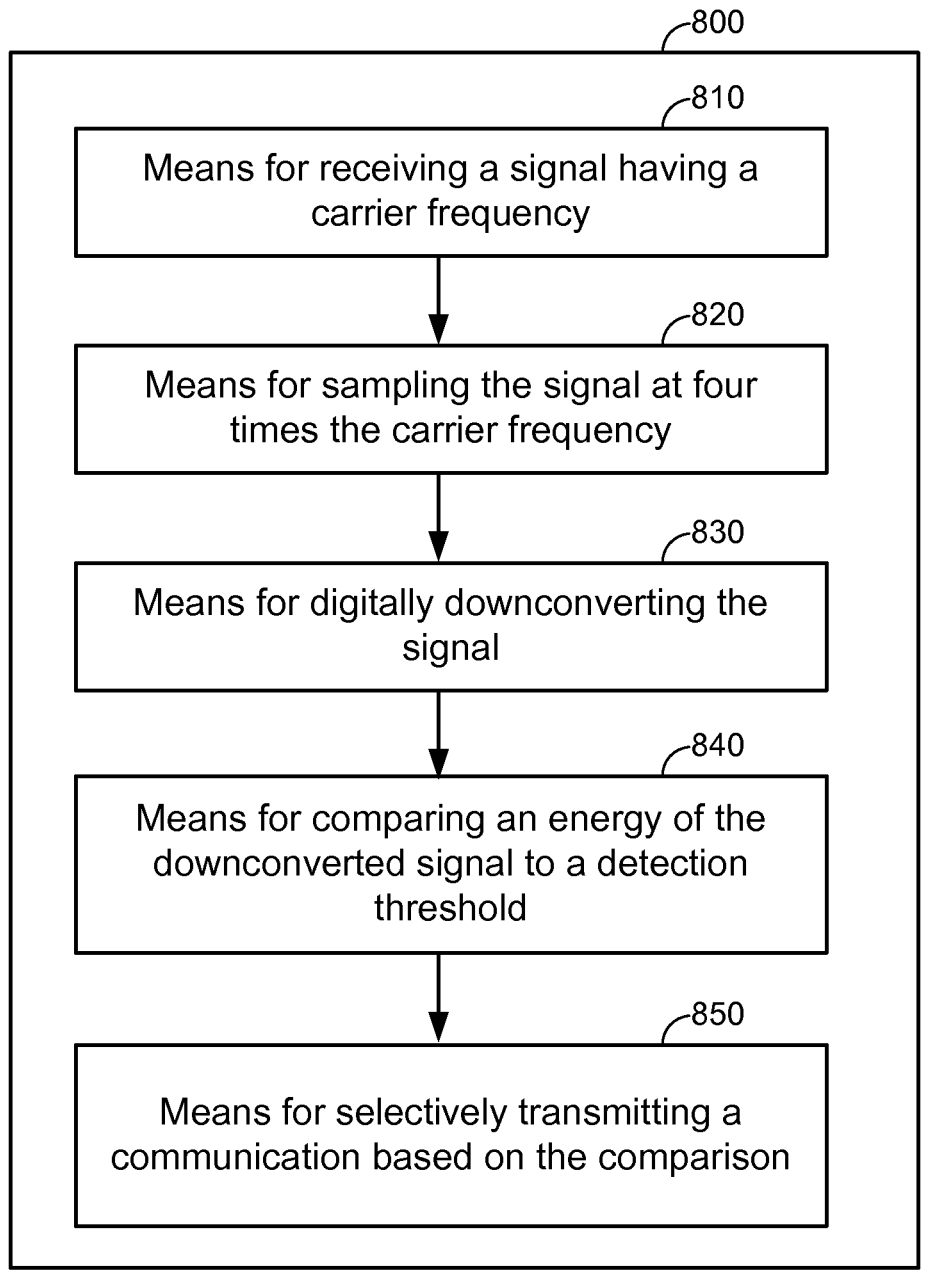
FIG. 8 is a functional block diagram of an apparatus for wireless communication, in accordance with an embodiment of the invention.

FIG. 8 is a functional block diagram of an apparatus for wireless communication 800, in accordance with an embodiment of the invention. Those skilled in the art will appreciate that an apparatus for wireless communication can have more components than the simplified apparatus 800 shown in FIG. 8. The apparatus for wireless communication 800 shown includes only those components useful for describing some prominent features of implementations within the scope of the claims. The apparatus for wireless communication 800 includes means 810 for receiving a signal having a carrier frequency, means 820 for sampling the signal at four times the carrier frequency, means 830 for digitally downconverting the signal, means 840 for comparing an energy of the downconverted signal to a detection threshold, and means 850 for selectively transmitting a communication based on the comparison.

In an embodiment, the means 810 for receiving a signal having a carrier frequency can be configured to perform one or more of the functions described above with respect to block 710 (FIG. 7). In various embodiments, the means 810 receiving a signal having a carrier frequency can be implemented by one or more of the antennas 118 (FIG. 1), 218 (FIG. 2), 352 (FIG. 3), 418 (FIG. 4), and the receiver 408 (FIG. 4).

In an embodiment, the means 820 for sampling the signal at four times the carrier frequency can be configured to perform one or more of the functions described above with respect to block 720 (FIG. 7). In various embodiments, the means 820 for sampling the signal at four times the carrier frequency can be implemented by the ADC 442 (FIG. 4).

In an embodiment, the means 830 for digitally downconverting the signal can be configured to perform one or more of the functions described above with respect to block 730 (FIG. 7). In various embodiments, the means 830 for digitally downconverting the signal can be implemented by one or more of the digital mixer 444 (FIG. 4) and the IIR filter 446 (FIG. 4).

In an embodiment, the means 840 for comparing an energy of the downconverted signal to a detection threshold can be configured to perform one or more of the functions described above with respect to block 740 (FIG. 7). In various embodiments, the means 840 for comparing an energy of the downconverted signal to a detection threshold can be implemented by one or more of the energy detector 448 (FIG. 4) and the threshold comparator 450 (FIG. 4).

In an embodiment, the means 850 for selectively transmitting a communication based on the comparison can be configured to perform one or more of the functions described above with respect to block 750 (FIG. 7). In various embodiments, the means 850 for selectively transmitting a communication based on the comparison can be implemented by one or more of the antennas 114 (FIG. 1), 118 (FIG. 1), 214 (FIG. 2), 218 (FIG. 2), 352 (FIG. 3), and 418 (FIG. 4), the transmitter 206 (FIG. 2), and the processor 460 (FIG. 4).

As used herein, the term "determining" encompasses a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. Further, a "channel width" as used herein can encompass or can also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium can include non-transitory computer readable medium (e.g., tangible media). In addition, in some aspects computer readable medium can include transitory computer readable medium (e.g., a signal). Combinations of the above should also be included within the scope of computer-readable media.

The methods disclosed herein include one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

The functions described can be implemented in hardware, software, firmware or any combination thereof. If implemented in software, the functions can be stored as one or more instructions on a computer-readable medium. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects can include a computer program product for performing the operations presented herein. For example, such a computer program product can include a computer readable medium having instructions stored (and/or encoded) thereon, the instructions being executable by one or more processors to perform the operations described herein. For certain aspects, the computer program product can include packaging material.

Software or instructions can also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations can be made in the arrangement, operation and details of the methods and apparatus described above without departing from the scope of the claims.

While the foregoing is directed to aspects of the present disclosure, other and further aspects of the disclosure can be devised without departing from the basic scope thereof, and the scope thereof is determined by the claims that follow.

What is claimed is:

1. A method of detecting an inductive communication transmission, comprising:
   receiving an inductive communication signal having a center frequency;
   sampling the signal at a rate higher than twice the center frequency;
   digitally downconverting the sampled signal;
   comparing an energy of the downconverted signal to a detection threshold; and
   selectively transmitting a communication based on the comparison, wherein selectively transmitting comprises transmitting the communication when the energy of the downconverted signal is below the detection threshold.

2. The method of claim 1, wherein the transmission comprises a near-field communications (NFC) transmission.

3. The method of claim 1, wherein the center frequency is substantially 13.56 MHz.

4. The method of claim 1, wherein the sampling rate is substantially four times the center frequency.

5. The method of claim 1, wherein digitally downconverting the signal comprises downconverting the signal with a quadrature mixer generating coefficients from the set $\{0, 1, -1\}$.

6. The method of claim 1, further comprising determining the energy of the downconverted signal.

7. The method of claim 1, further comprising refraining from transmitting the communication when the energy of the downconverted signal is equal to or greater than the detection threshold.

8. The method of claim 1, wherein the detection threshold comprises 0.187 A/m.

9. A method of collision avoidance in a near-field communications (NFC) device, the method comprising:
   receiving a NFC signal having a carrier frequency;
   sampling the signal at four times the carrier frequency;
   digitally downconverting the sampled signal;
   comparing an energy of the downconverted signal to a detection threshold; and
   selectively transmitting a communication based on the comparison, wherein selectively transmitting comprises transmitting the communication when the energy of the downconverted signal is below the detection threshold.

10. A device configured to detect an inductive communication transmission comprising:
    a receiver configured to receive an inductive communication signal having a center frequency;
    an analog-to-digital converter configured to sample the signal at a rate higher than twice the center frequency;
    one or more processors configured to:
       digitally downconvert the sampled signal; and
       compare an energy of the downconverted signal to a detection threshold; and a transmitter configured to selectively transmit a communication based on the comparison, wherein the transmitter is further configured to transmit the communication when the energy of the downconverted signal is below the detection threshold.

11. The device of claim 10, wherein the transmission comprises a near-field communications (NFC) transmission.

12. The device of claim 10, wherein the center frequency is substantially 13.56 MHz.

13. The device of claim 10, wherein the sampling rate is substantially four times the center frequency.

14. The device of claim 10, further comprising a quadrature mixer generating coefficients from the set {0, 1, −1}.

15. The device of claim 10, wherein the processor is further configured to determine the energy of the downconverted signal.

16. The device of claim 10, wherein the transmitter is configured to transmit the communication when the energy of the downconverted signal is equal to or greater than the detection threshold.

17. The device of claim 10, wherein the detection threshold comprises 0.187 A/m.

18. A near-field communication (NFC) device configured to avoidance collision, the device comprising:
    a receiver configured to receive a NFC signal having a carrier frequency;
    an analog-to-digital converter configured to sample the signal at four times the carrier frequency;
    one or more processors configured to:
        digitally downconvert the sampled signal; and
        compare an energy of the downconverted signal to a detection threshold; and
    a transmitter configured to selectively transmit a communication based on the comparison, wherein the transmitter is further configured to transmit the communication when the energy of the downconverted signal is below the detection threshold.

19. An apparatus for detecting an inductive communication transmission comprising:
    means for receiving an inductive communication signal having a center frequency;
    means for sampling the signal at a rate higher than twice the center frequency;
    means for digitally downconverting the signal;
    means for comparing an energy of the downconverted signal to a detection threshold; and
    means for selectively transmitting a communication based on the comparison comprising means for transmitting the communication when the energy of the downconverted signal is below the detection threshold.

20. The apparatus of claim 19, wherein the transmission comprises a near-field communications (NFC) transmission.

21. The apparatus of claim 19, wherein the center frequency is substantially 13.56 MHz.

22. The apparatus of claim 19, wherein the sampling rate is substantially four times the center frequency.

23. The apparatus of claim 19, wherein means for digitally downconverting the signal comprises means for downconverting the signal and generating coefficients from the set {0, 1, −1}.

24. The apparatus of claim 19, further comprising means for determining the energy of the downconverted signal.

25. The apparatus of claim 19, further comprising means for refraining from transmitting the communication when the energy of the downconverted signal is equal to or greater than the detection threshold.

26. The apparatus of claim 19, wherein the detection threshold comprises 0.187 A/m.

27. An apparatus for collision avoidance in a near-field communications (NFC) device, the apparatus comprising:
    means for receiving a NFC signal having a carrier frequency;
    means for sampling the signal at four times the carrier frequency;
    means for digitally downconverting the sampled signal;
    means for comparing an energy of the downconverted signal to a detection threshold; and
    means for selectively transmitting a communication based on the comparison comprising means for transmitting the communication when the energy of the downconverted signal is below the detection threshold.

28. A non-transitory computer-readable medium comprising code that, when executed, causes an apparatus to:
    receive an inductive communication signal having a center frequency;
    sample the signal at a rate higher than twice the center frequency;
    digitally downconvert the sampled signal;
    compare an energy of the downconverted signal to a detection threshold; and
    selectively transmit a communication based on the comparison, wherein selectively transmitting comprises transmitting the communication when the energy of the downconverted signal is below the detection threshold.

29. The medium of claim 28, wherein the transmission comprises a near-field communications (NFC) transmission.

30. The medium of claim 28, wherein the center frequency is substantially 13.56 MHz.

31. The medium of claim 28, wherein the sampling rate is substantially four times the center frequency.

32. The medium of claim 28, wherein digitally downconverting the signal comprises downconverting the signal with a quadrature mixer generating coefficients from the set {0, 1, −1}.

33. The medium of claim 28, further comprising code that, when executed, causes the apparatus to determine the energy of the downconverted signal.

34. The medium of claim 28, further comprising code that, when executed, causes the apparatus to transmit the communication when the energy of the downconverted signal is equal to or greater than the detection threshold.

35. The medium of claim 28, wherein the detection threshold comprises 0.187 A/m.

36. A non-transitory computer-readable medium comprising code that, when executed, causes a near-field communication (NFC) apparatus to:
    receive a NFC signal having a carrier frequency;
    sample the signal at four times the carrier frequency;
    digitally downconvert the sampled signal;
    compare an energy of the downconverted signal to a detection threshold; and
    selectively transmit a communication based on the comparison, wherein selectively transmitting comprises transmitting the communication when the energy of the downconverted signal is below the detection threshold.

* * * * *